(12) United States Patent
Shan et al.

(10) Patent No.: US 11,926,098 B1
(45) Date of Patent: Mar. 12, 2024

(54) WIRE FEEDING MECHANISM SUITABLE FOR FUSED DEPOSITION ADDITIVE MANUFACTURING (AM) OF FLEXIBLE WIRE

(71) Applicant: NANJING UNIVERSITY OF AERONAUTICS AND ASTRONAUTICS, Nanjing (CN)

(72) Inventors: Zhongde Shan, Nanjing (CN); Congze Fan, Nanjing (CN); Wenzhe Song, Nanjing (CN); Yiwei Chen, Nanjing (CN); Jinghua Zheng, Nanjing (CN); Linlin Luo, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/243,651

(22) Filed: Sep. 7, 2023

Related U.S. Application Data

(63) Continuation of application No. PCT/CN2023/077081, filed on Feb. 20, 2023.

(51) Int. Cl.
*B29C 64/321* (2017.01)
*B29C 64/118* (2017.01)
*B33Y 30/00* (2015.01)

(52) U.S. Cl.
CPC .......... *B29C 64/321* (2017.08); *B29C 64/118* (2017.08); *B33Y 30/00* (2014.12)

(58) Field of Classification Search
CPC ...... B29C 64/321; B29C 64/118; B33Y 30/00
See application file for complete search history.

(56) References Cited

FOREIGN PATENT DOCUMENTS

| CN | 106515006 A | 3/2017 |
|---|---|---|
| CN | 206277660 U | 6/2017 |
| CN | 208084991 U | 11/2018 |
| CN | 210590615 U | 5/2020 |
| CN | 215882592 U | 2/2022 |
| WO | 2022171729 A1 | 8/2022 |
| WO | 2022222431 A1 | 10/2022 |

*Primary Examiner* — Joseph S Del Sole
*Assistant Examiner* — Mohamed K Ahmed Ali
(74) *Attorney, Agent, or Firm* — Bayramoglu Law Offices LLC

(57) ABSTRACT

A wire feeding mechanism suitable for fused deposition Additive Manufacturing (AM) of a flexible wire is provided, which includes a support housing. A melting nozzle is arranged at the lower end of the support housing, a hook is connected to the inner wall of the top end of the support housing, a connecting rod is connected to the inner wall of one side of the support housing, a wire drawing mechanism is connected to one end of the connecting rod, the wire drawing mechanism is located at the lower end of the hook, a limiting mechanism and a wire guide mechanism are connected to the inner wall of one side of the support housing, the limiting mechanism is located at the lower end of the wire drawing mechanism, the wire guide mechanism is located at the lower end of the limiting mechanism.

8 Claims, 3 Drawing Sheets

WIRE FEEDING MECHANISM SUITABLE FOR FUSED DEPOSITION ADDITIVE MANUFACTURING (AM) OF FLEXIBLE WIRE

CROSS REFERENCE TO THE RELATED APPLICATIONS

This application is a continuation application of International Application No. PCT/CN2023/077081, filed on Feb. 20, 2023, which is based upon and claims priority to Chinese Patent Application No. 202211335743.5, filed on Oct. 28, 2022, the entire contents of which are incorporated herein by reference.

TECHNICAL FIELD

The present invention relates to the technical field of Three-Dimensional (3D) printing, and in particular to a wire feeding mechanism suitable for fused deposition Additive Manufacturing (AM) of a flexible wire.

BACKGROUND

At present, AM (commonly known as 3D printing) technology has become a research hotspot at home and abroad. The technology has the characteristics of rapidity, high efficiency, flexibility, etc., and does not need traditional molds, tools and fixtures, but uses 3D design data to efficiently and accurately manufacture, on an AM device, parts with any complex shape and structure. The AM technology can process a wide range of raw materials. The AM technology of non-metallic materials (mainly organic polymer materials) has been relatively mature.

In the prior art, in order to prevent wire winding, a hook may be provided on the device for wire separation. But when a relatively soft flexible material such as a Thermoplastic Polyurethane (TPU) material is printed, the position in contact with the hook is likely to cause temporary accumulation and then cake, which affects the progress of wire feeding, and even directly affects the printing effect.

SUMMARY

In order to solve the above problem, the present invention discloses a wire feeding mechanism suitable for fused deposition AM of a flexible wire, which aims to solve the technical problem that when a flexible material is printed, the position in contact with a hook is likely to cause temporary accumulation and then cake.

In order to achieve the above objectives, the present invention adopts the following technical solution:

A wire feeding mechanism suitable for fused deposition Additive Manufacturing (AM) of a flexible wire, comprising a support housing, a melting nozzle is arranged at the lower end of the support housing, a hook is connected to the inner wall of the top end of the support housing, a connecting rod is connected to the inner wall of one side of the support housing, a wire drawing mechanism is connected to one end of the connecting rod, the wire drawing mechanism is located below the hook, a limiting mechanism and a wire guide mechanism are connected to the inner wall of one side of the support housing, the limiting mechanism is located below the wire drawing mechanism, the wire guide mechanism is located below the limiting mechanism, the wire drawing mechanism comprises a support seat, the support seat is connected to the connecting rod, an electric chute is arranged in the inner wall of the top end of the support seat, an electric sliding block is movably connected to the inner wall of the electric chute in a clamped manner, a sixth bracket is connected to the outer wall of the top end of the electric sliding block, a plurality of third connecting shafts are arranged on the inner wall of the sixth bracket, a fourth roller is connected to the outer wall of each of the third connecting shafts in a sleeving manner, a wire is arranged on the hook, and the wire passes through the limiting mechanism and the wire guide mechanism in sequence A wire drawing mechanism is arranged. Since the wire is a flexible wire, when the wire is hung on the hook and conveyed to the position of a melting nozzle under the action of a wire guide mechanism, the position in contact with the hook is likely to cause temporary accumulation and then cake. A sixth bracket is driven via an electric sliding block in the wire drawing mechanism to move along an electric chute in a support seat. When the electric sliding block moves to a high position of the electric chute, a fourth roller just contacts the bottom end of the wire on the hook, and the movement of the wire may also drive the fourth roller to move, thereby acting on a joint between the wire and the hook and reducing the risk of wire caking. Meanwhile, the circulating movement of the electric sliding block in the electric chute also plays a role of assisting the wire to loosen the caking position. When the electric sliding block slides to the lower end of the electric chute, the electric sliding block may be disconnected from the wire, thus avoiding a situation of knotting caused by torsion of the wire driven by the circulating movement.

In a preferred solution, the wire guide mechanism comprises a limiting block, a third connecting rod is arranged at both sides of the limiting block, the third connecting rod is connected to the inner wall of the support housing, a third roller is arranged aside the limiting block, a plurality of rubber pads are arranged on the outer wall of the third roller at equal density, and the wire is located between the rubber pads and the limiting block; a gear is connected to the outer wall of one side of the third roller, a second gear is connected to the outer wall of the gear in a clamped manner, a second clamp block is connected to the outer wall of one side of the second gear, and a motor is connected to one end of the second clamp block; a fifth bracket is movably connected to the inner wall of the second clamp block in a clamped manner, a connecting seat is arranged on the inner walls of two sides of the fifth bracket, the connecting seat is connected to the gear and the third roller, respectively, a third bracket is arranged on the outer wall of one side of the fifth bracket, the third bracket is connected to the motor, a fourth bracket is movably connected to the outer wall of the fifth bracket, a second pneumatic rod is arranged on the inner wall of one side of the fourth bracket, and the second pneumatic rod is connected to the fifth bracket at the same time.

The second pneumatic rod is arranged, and a telescopic length of the second pneumatic rod is controlled, so that the position between the limiting block and the rubber pad on the third roller can be further controlled. Accordingly, the wire guide mechanism is applicable to wires of different models for use. Meanwhile, through the arranged rubber pad, the wire with the material being a flexible wire can be protected from damage during wire guide while the third roller is ensured to tightly contact the wire, thus avoiding the wire from being deformed by extrusion of the third roller.

Further improvement, clamp strips are arranged on the outer walls of the two sides of the fifth bracket, clamp slots are formed in the inner walls of the two sides of the fourth bracket, and the fifth bracket is movably connected to the fourth bracket by interconnecting the clamp strips and the clamp slots in a clamped manner; a support plate is connected to the outer wall of one side of the fifth bracket, a sliding block is arranged at the top end of the support plate, a top chute is connected to the top end of the fourth bracket, and the sliding block is movably connected into the top chute in a clamped manner.

The second clamp block is connected to the inner wall of the fifth bracket in a clamped manner, so that the position of the second gear is ensured, and the second gear can be ensured to be perfectly clamped with the gear. Meanwhile, the sliding block is connected into the top chute in a clamped manner, and the clamp strips on the two sides are connected into the clamp slots in a clamped manner, so that three orientations of the third roller can all be limited, it can be guaranteed that the third roller is not loosened and displaced during long-time use, the third roller can be avoided from being separated from a clamping position with the limiting block, and the service life of the wire feeding mechanism can be guaranteed.

Further improvement, the limiting mechanism comprises a bracket and a second bracket, a second connecting rod is connected to the outer wall of one side of the bracket, the second connecting rod is connected to the support housing, a connecting shaft is arranged on the inner wall of the bracket, and a roller is connected to the outer wall of the connecting shaft in a sleeving manner; ball bearings are arranged on the inner walls of two sides of the second bracket, a clamp block is connected to the inner walls of the ball bearings in a clamped manner, a second connecting shaft is connected to one side of the clamp block, a second roller is connected to the outer wall of the second connecting shaft in a sleeving manner, soft bumps are arranged on the outer wall of the second roller at equal density, a pneumatic rod is connected to one side of the second bracket, and the other side of the pneumatic rod is connected to the support housing.

The limiting mechanism is arranged and acts on the two sides of the wire, so that the wire can accurately enter the wire guide mechanism, and the wire can be avoided from dislocation to cause the wire guide mechanism incapable of normally guiding the wire. Meanwhile, the soft bumps are arranged on the outer wall of the second roller at equal density, so that when the wire is limited and contacts the soft bumps, the second roller may be driven to rotate. Under the action of the ball bearings, the friction subjected to by the second roller during rotation can be reduced. In a rotating process of the second roller, the soft bumps can be intermittently separated from the wire, so that the surface of wire can be avoided from abrasion caused due to long-term contact with the wire.

The working principle of the present invention is: when in use, the sixth bracket is driven via the electric sliding block in the wire drawing mechanism to move along the electric chute in the support seat. When the electric sliding block moves to a high position of the electric chute, the fourth roller just contacts the bottom end of the wire on the hook, and the movement of the wire may also drive the fourth roller to move, thereby acting on a joint between the wire and the hook and reducing the risk of wire caking. Meanwhile, the circulating movement of the electric sliding block in the electric chute also plays a role of assisting the wire to loosen the caking position. When the electric sliding block slides to the lower end of the electric chute, the electric sliding block may be disconnected from the wire, thus avoiding a situation of knotting caused by torsion of the wire driven by the circulating movement.

It can be seen from the above that the beneficial effects of the present invention are that:

1. The wire feeding mechanism suitable for fused deposition AM of a flexible wire has the effect of reducing the risk of caking at the joint between the wire and the hook.
2. The printing effect is ensured and the work efficiency is improved.
3. The service life of the device is prolonged.

BRIEF DESCRIPTION OF THE DRAWINGS

In FIGS. 1-5: 1, support housing; 2, wire; 3, melting nozzle; 4, hook; 5, wire drawing mechanism; 6, connecting rod; 7, limiting mechanism; 8, wire guide mechanism; 9, second connecting rod; 10, bracket; 11, connecting shaft; 12, roller; 13, clamp block; 14, second connecting shaft; 15, ball bearing; 16, second bracket; 17, pneumatic rod; 18, second roller; 19, soft bump; 20, third connecting rod; 21, limiting block; 22, rubber pad; 23, third roller; 24, gear; 25, motor; 26, second clamp block; 27, second gear; 28, third bracket; 29, clamp strip; 30, fourth bracket; 31, second pneumatic rod; 32, clamp slot; 33, top chute; 34, fifth bracket; 35, sliding block; 36, support plate; 37, connecting seat; 38, sixth bracket; 39, fourth roller; 40, third connecting shaft; 41, electric sliding block; 42, electric chute; and 43, support seat.

DETAILED DESCRIPTION OF THE EMBODIMENTS

Figure 1:
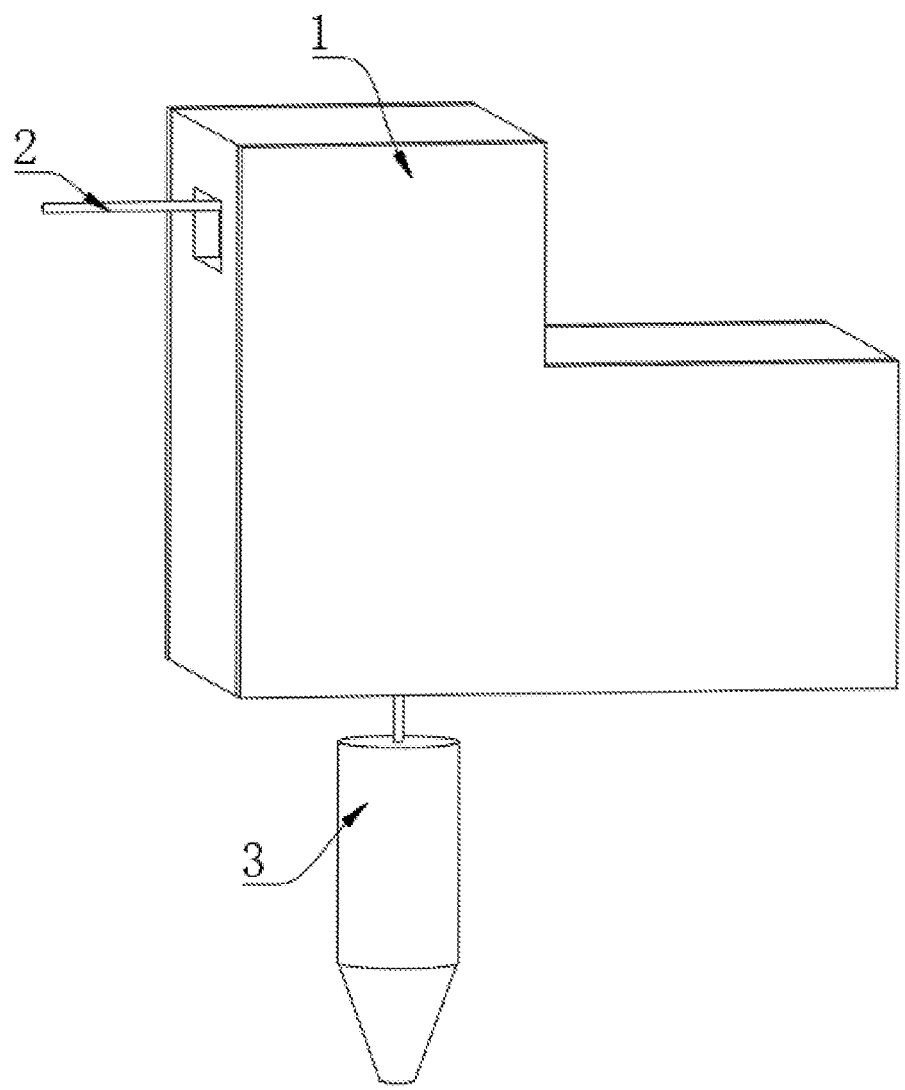
FIG. 1 is a schematic structural diagram of overall appearance of a wire feeding mechanism suitable for fused deposition AM of a flexible wire proposed by the present invention.

The present invention is further illustrated below in conjunction with the drawings and specific embodiments, and it should be understood that the following specific embodiments are merely used to illustrate the present invention and not to limit the scope of the present invention. It should be noted that the words "front", "back", "left", "right", "upper", and "lower" used in the following description refer to directions in the drawings, and the words "inner" and "outer" respectively refer to directions toward or away from the geometric center of a particular component.

A wire feeding mechanism suitable for fused deposition AM of a flexible wire disclosed in the present invention is mainly applied to a scenario of 3D printing.

Figure 2:
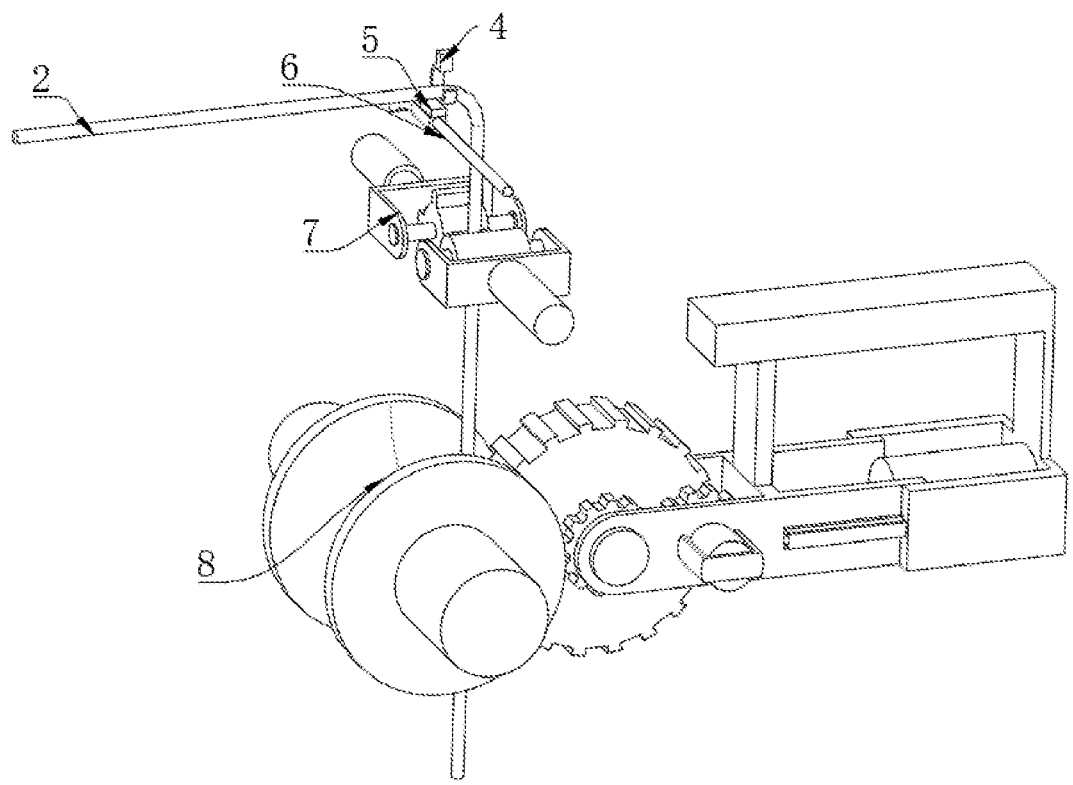
FIG. 2 is an overall schematic structural diagram of inside of a wire feeding mechanism suitable for fused deposition AM of a flexible wire proposed by the present invention.
Figure 5:
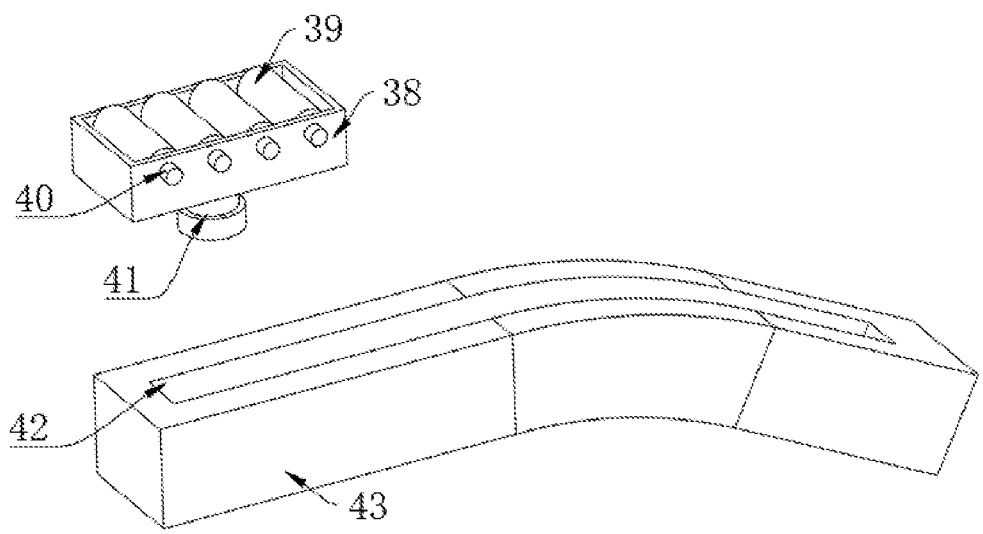
FIG. 5 is a schematic structural diagram of splitting a wire drawing mechanism of a wire feeding mechanism suitable for fused deposition AM of a flexible wire proposed by the present invention.

Referring to FIGS. 1, 2 and 5, a wire feeding mechanism suitable for fused deposition AM of a flexible wire includes a support housing 1. A melting nozzle 3 is arranged at the lower end of the support housing 1, a hook 4 is connected to the inner wall of the top end of the support housing 1, a connecting rod 6 is connected to the inner wall of one side of the support housing 1, a wire drawing mechanism 5 is connected to one end of the connecting rod 6, the wire drawing mechanism 5 is located below the hook 4, a limiting mechanism 7 and a wire guide mechanism 8 are connected to the inner wall of one side of the support housing 1, the limiting mechanism 7 is located below the wire drawing mechanism 5, the wire guide mechanism 8 is located below the limiting mechanism 7, the wire drawing mechanism 5 includes a support seat 43, the support seat 43 is connected to the connecting rod 6, an electric chute 42 is arranged in the inner wall of the top end of the support seat 43, an electric sliding block 41 is movably connected to the inner wall of the electric chute 42 in a clamped manner, a sixth bracket 38 is connected to the outer wall of the top end of the electric sliding block 41, a plurality of third connecting shafts 40 are arranged on the inner wall of the sixth bracket 38, a fourth roller 39 is connected to the outer walls of the plurality of third connecting shafts 40 in a sleeving manner, a wire 2 is arranged on the hook 4, and the wire 2 passes through the limiting mechanism 7 and the wire guide mechanism 8 at the same time.

Figure 4:
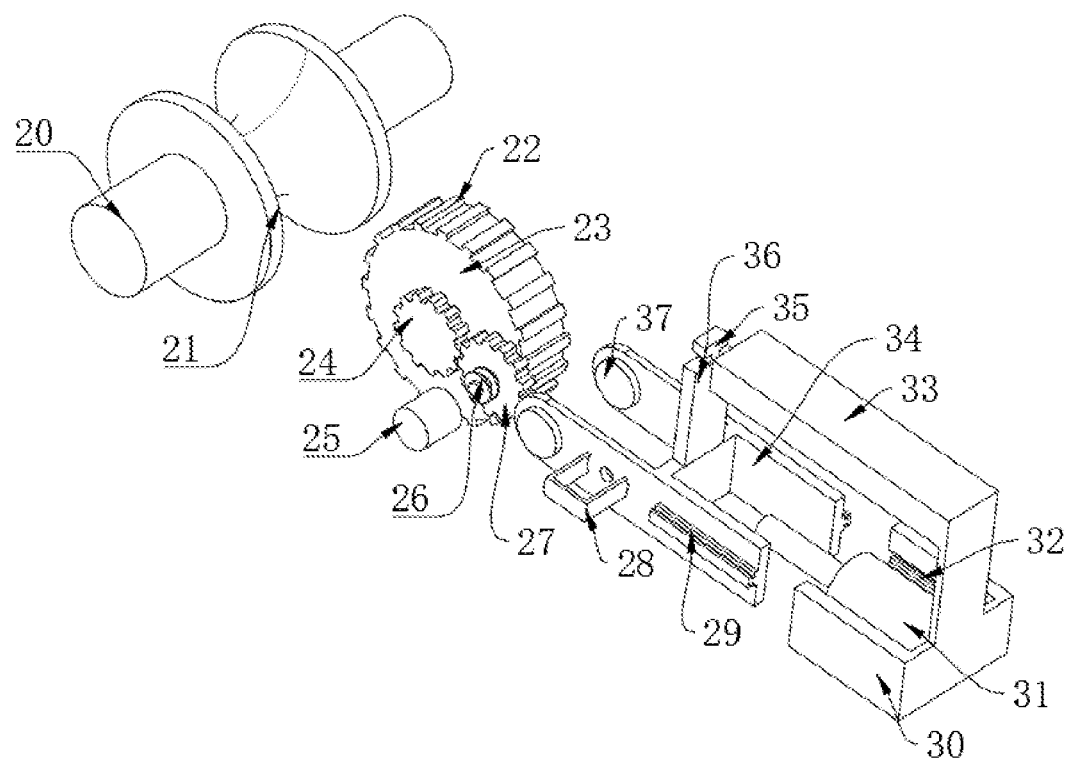
FIG. 4 is a schematic structural diagram of splitting a wire guide mechanism of a wire feeding mechanism suitable for fused deposition AM of a flexible wire proposed by the present invention.

Referring to FIG. 4, in a preferred implementation, the wire guide mechanism 8 includes a limiting block 21, a third connecting rod 20 is arranged at both sides of the limiting block 21, the third connecting rod 20 is connected to the inner wall of the support housing 1, the wire guide mechanism 8 includes a third roller 23, a plurality of rubber pads 22 are arranged on the outer wall of the third roller 23 at equal density, and the wire 2 is located between the rubber pads 22 and the limiting block 21.

Referring to FIG. 4, in a preferred implementation, a gear 24 is connected to the outer wall of one side of the third roller 23, a second gear 27 is connected to the outer wall of the gear 24 in a clamped manner, a second clamp block 26 is connected to the outer wall of one side of the second gear 27, and a motor 25 is connected to one end of the second clamp block 26.

Referring to FIG. 4, in a preferred implementation, a fifth bracket 34 is movably connected to the inner wall of the second clamp block 26 in a clamped manner, a connecting seat 37 is arranged on the inner walls of two sides of the fifth bracket 34, the connecting seat 37 is connected to the gear 24 and the third roller 23, respectively, a third bracket 28 is arranged on the outer wall of one side of the fifth bracket 34, the third bracket 28 is connected to the motor 25, a fourth bracket 30 is movably connected to the outer wall of the fifth bracket 34, a second pneumatic rod 31 is arranged on the inner wall of one side of the fourth bracket 30, and the second pneumatic rod 31 is connected to the fifth bracket 34 at the same time. The second pneumatic rod 31 is arranged, and a telescopic length of the second pneumatic rod 31 is controlled, so that the position between the limiting block 21 and the rubber pad 22 on the third roller 23 can be further controlled. Accordingly, the wire guide mechanism 8 is applicable to wires 2 of different models for use. Meanwhile, through the arranged rubber pad 22, the wire 2 with the material being a flexible wire can be protected from damage during wire guide while the third roller 23 is ensured to tightly contact the wire 2, thus avoiding the wire 2 from being deformed by extrusion of the third roller 23.

Referring to FIG. 4, in a preferred implementation, clamp strips 29 are arranged on the outer walls of the two sides of the fifth bracket 34, clamp slots 32 are formed in the inner walls of the two sides of the fourth bracket 30, and the fifth bracket 34 is movably connected to the fourth bracket 30 by interconnecting the clamp strips 29 and the clamp slots 32 in a clamped manner.

Referring to FIG. 4, in a preferred implementation, a support plate 36 is connected to the outer wall of one side of the fifth bracket 34, a sliding block 35 is arranged at the top end of the support plate 36, a top chute 33 is connected to the top end of the fourth bracket 30, and the sliding block 35 is movably connected into the top chute 33 in a clamped manner. The second clamp block 26 is connected to the inner wall of the fifth bracket 34 in a clamped manner, so that the position of the second gear 27 is ensured, and the second gear 27 can be ensured to be perfectly clamped with the gear 24. Meanwhile, the sliding block 35 is connected into the top chute 33 in a clamped manner, and the clamp strips 29 on the two sides are connected into the clamp slots 32 in a clamped manner, so that three orientations of the third roller 23 can all be limited, it can be guaranteed that the third roller 23 is not loosened and displaced during long-time use, the third roller 23 can be avoided from being separated from a clamping position with the limiting block 21, and the service life of the wire feeding mechanism can be guaranteed.

Figure 3:
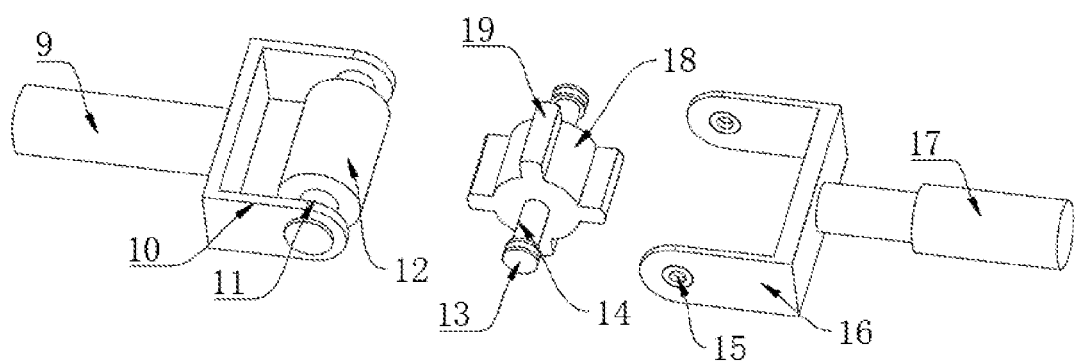
FIG. 3 is a schematic structural diagram of splitting a limiting mechanism of a wire feeding mechanism suitable for fused deposition AM of a flexible wire proposed by the present invention.

Referring to FIG. 3, in a preferred implementation, the limiting mechanism 7 includes a bracket 10 and a second bracket 16, a second connecting rod 9 is connected to the outer wall of one side of the bracket 10, the second connecting rod 9 is connected to the support housing 1, a connecting shaft 11 is arranged on the inner wall of the bracket 10, and a roller 12 is connected to the outer wall of the connecting shaft 11 in a sleeving manner.

Referring to FIG. 3, in a preferred implementation, ball bearings 15 are arranged on the inner walls of two sides of the second bracket 16, a clamp block 13 is connected to the inner walls of the ball bearings 15 in a clamped manner, a second connecting shaft 14 is connected to one side of the clamp block 13, a second roller 18 is connected to the outer wall of the second connecting shaft 14 in a sleeving manner, soft bumps 19 are arranged on the outer wall of the second roller 18 at equal density, a pneumatic rod 17 is connected to one side of the second bracket 16, and the other side of the pneumatic rod 17 is connected to the support housing 1. The limiting mechanism 7 is arranged and acts on the two sides of the wire 2, so that the wire 2 can accurately enter the wire guide mechanism 8, and the wire 2 can be avoided from dislocation to cause the wire guide mechanism 8 incapable of normally guiding the wire. Meanwhile, the soft bumps 19 are arranged on the outer wall of the second roller 18 at equal density, so that when the wire 2 is limited and contacts the soft bumps 19, the second roller 18 may be driven to rotate. Under the action of the ball bearings 15, the friction subjected to by the second roller 18 during rotation can be reduced. In a rotating process of the second roller 18, the soft bumps 19 can be intermittently separated from the wire 2, so that the surface of wire 2 can be avoided from abrasion caused due to long-term contact with the wire 2.

Working principle: when in use, the sixth bracket 38 is driven via the electric sliding block 41 in the wire drawing mechanism 5 to move along the electric chute 42 in the support seat 43. When the electric sliding block 41 moves to a high position of the electric chute 42, the fourth roller 39 just contacts the bottom end of the wire 2 on the hook 4, and the movement of the wire 2 may also drive the fourth roller 39 to move, thereby acting on a joint between the wire 2 and the hook 4 and reducing the risk of wire 2 caking. Meanwhile, the circulating movement of the electric sliding block 41 in the electric chute 42 also plays a role of assisting the wire 2 to loosen the caking position. When the electric sliding block 41 slides to the lower end of the electric chute 42, the electric sliding block 41 may be disconnected from the wire 2, thus avoiding a situation of knotting caused by torsion of the wire 2 driven by the circulating movement.

The technical means disclosed by the solution of the present invention are not limited to these disclosed in the above implementations and further include the technical solution formed by any combination of the above technical features.

What is claimed is:

1. A wire feeding mechanism suitable for a fused deposition Additive Manufacturing (AM) of a flexible wire, comprising a support housing, wherein a melting nozzle is arranged at a lower end of the support housing, a hook is connected to an inner wall of a top end of the support housing, a connecting rod is connected to the inner wall of one side of the support housing, a wire drawing mechanism is connected to one end of the connecting rod, the wire drawing mechanism is located below the hook, a limiting mechanism and a wire guide mechanism are connected to the inner wall of one side of the support housing, the limiting mechanism is located below the wire drawing mechanism, the wire guide mechanism is located below the limiting mechanism, the wire drawing mechanism comprises a support seat, the support seat is connected to the connecting rod, an electric chute is arranged in an inner wall of a top end of the support seat, an electric sliding block is movably connected to an inner wall of the electric chute in a clamped manner, a sixth bracket is connected to an outer wall of a top end of the electric sliding block, a plurality of third connecting shafts are arranged on an inner wall of the sixth bracket, a fourth roller is connected to an outer wall of each of the plurality of third connecting shafts in a sleeving manner, a wire is arranged on the hook, and the wire passes through the limiting mechanism and the wire guide mechanism in sequence.

2. The wire feeding mechanism suitable for the fused deposition AM of the flexible wire according to claim 1, wherein the wire guide mechanism comprises a limiting block, a third connecting rod is arranged at two sides of the limiting block, the third connecting rod is connected to the inner wall of the support housing, a third roller is arranged aside the limiting block, a plurality of rubber pads are arranged on an outer wall of the third roller at an equal density, and the wire is located between the plurality of rubber pads and the limiting block.

3. The wire feeding mechanism suitable for the fused deposition AM of the flexible wire according to claim 2, wherein a gear is connected to the outer wall of one side of the third roller, a second gear is connected to an outer wall of the gear in a clamped manner, a second clamp block is connected to an outer wall of one side of the second gear, and a motor is connected to one end of the second clamp block.

4. The wire feeding mechanism suitable for the fused deposition AM of the flexible wire according to claim 3, wherein a fifth bracket is movably connected to an inner wall of the second clamp block in a clamped manner, a connecting seat is arranged on inner walls of two sides of the fifth bracket, the connecting seat is connected to the gear and the third roller, respectively, a third bracket is arranged on an outer wall of one side of the fifth bracket, the third bracket is connected to the motor, a fourth bracket is movably connected to the outer wall of the fifth bracket, a second pneumatic rod is arranged on an inner wall of one side of the fourth bracket, and the second pneumatic rod is connected to the fifth bracket at the same time.

5. The wire feeding mechanism suitable for the fused deposition AM of the flexible wire according to claim 4, wherein clamp strips are arranged on the outer wall of two sides of the fifth bracket, clamp slots are formed in the inner wall of two sides of the fourth bracket, and the fifth bracket is movably connected to the fourth bracket by interconnecting the clamp strips and the clamp slots in a clamped manner.

6. The wire feeding mechanism suitable for the fused deposition AM of the flexible wire according to claim 5, wherein a support plate is connected to the outer wall of one side of the fifth bracket, a sliding block is arranged at a top end of the support plate, a top chute is connected to a top end of the fourth bracket, and the sliding block is movably connected into the top chute in a clamped manner.

7. The wire feeding mechanism suitable for the fused deposition AM of the flexible wire according to claim 1, wherein the limiting mechanism comprises a bracket and a second bracket, a second connecting rod is connected to an outer wall of one side of the bracket, the second connecting rod is connected to the support housing, a connecting shaft is arranged on an inner wall of the bracket, and a roller is connected to an outer wall of the connecting shaft in a sleeving manner.

8. The wire feeding mechanism suitable for the fused deposition AM of the flexible wire according to claim 7, wherein ball bearings are arranged on inner walls of two sides of the second bracket, a clamp block is connected to inner walls of the ball bearings in a clamped manner, a second connecting shaft is connected to one side of the clamp block, a second roller is connected to an outer wall of the second connecting shaft in a sleeving manner, soft bumps are arranged on an outer wall of the second roller at an equal density, a pneumatic rod is connected to one side of the second bracket, and the other side of the pneumatic rod is connected to the support housing.

\* \* \* \* \*

UNITED STATES PATENT AND TRADEMARK OFFICE
CERTIFICATE OF CORRECTION

Page 1 of 1

PATENT NO. : 11,926,098 B1
APPLICATION NO. : 18/243651
DATED : March 12, 2024
INVENTOR(S) : Zhongde Shan et al.

It is certified that error appears in the above-identified patent and that said Letters Patent is hereby corrected as shown below:

On the Title Page

Item (30) Please add the missing Foreign Application Priority Data:
CN 202211335743.5 ; Priority date 10/28/2022

Signed and Sealed this
Sixteenth Day of April, 2024

Katherine Kelly Vidal
*Director of the United States Patent and Trademark Office*